Dec. 26, 1967　　　　TAISHO IKETANI　　　　3,360,165
　　　　DEVICE FOR AUTOMATICALLY AND INTERMITTENTLY
Filed July 14, 1965　　　SPRAYING PRESSURIZED PRODUCTS　　　3 Sheets-Sheet 2

INVENTOR.
Taisho Iketani
BY
Michael S. Striker
Atty

Dec. 26, 1967  TAISHO IKETANI  3,360,165
DEVICE FOR AUTOMATICALLY AND INTERMITTENTLY
SPRAYING PRESSURIZED PRODUCTS
Filed July 14, 1965  3 Sheets-Sheet 3
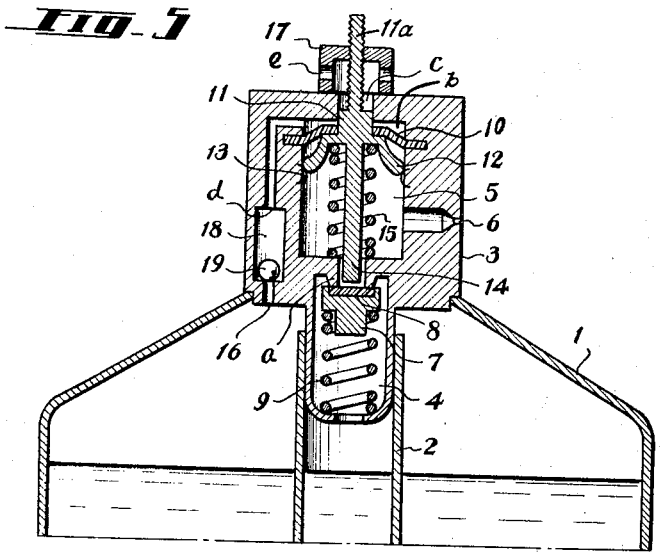
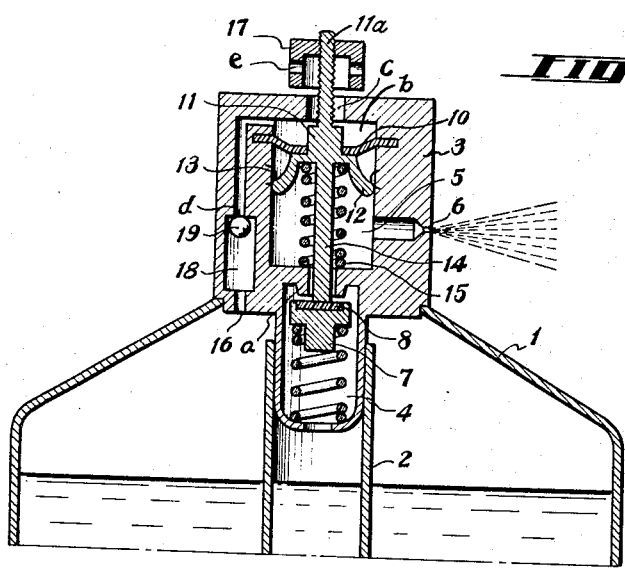
INVENTOR.
Taisho Iketani
BY
Michael J. Striker 3,360,165
**DEVICE FOR AUTOMATICALLY AND INTER-
MITTENTLY SPRAYING PRESSURIZED PROD-
UCTS**
Taisho Iketani, 41–6 4-chome Nogata,
Nakano-ku, Tokyo-to, Japan
Filed July 14, 1965, Ser. No. 471,931
Claims priority, application Japan, July 28, 1964,
39/42,453
11 Claims. (Cl. 222—54)

ABSTRACT OF THE DISCLOSURE

A receptacle defines a plenum chamber for supply of cooling fluid. A thermostatic valve is provided communicating with this chamber for the escape of fluid therefrom, and such valve comprises a thermo-responsive element arranged in the path of escaping coolant fluid for closing the valve in response to cooling resulting from such escaping fluid, and the element in the closed condition of the valve is sealed from the coolant fluid and exposed to the ambient atmosphere so as to open the valve in response to heating to the temperature of such atmosphere.

---

The present invention relates to improvement in a device for automatically and intermittently spraying product which is pressurizedly held in a container.

Some force is needed to spray out liquefied gas or compressed gas, etc. from the container in which it is pressurizedly held. After pressurized liquid containing effective ingredient is sprayed out, the resulting spray remains in the air for a comparatively short time, the effective ingredient settling down in a few minutes with consequent loss of the power.

An object of the present invention is to provide a simple device for automatically and intermittently spraying material which is pressurizedly held in a container so as to make the effective ingredient always remain in the air, by valve operation due to temperature change owing to latent heat of vaporization of the sprayed liquid. Various indirect automatic control methods have been conventionally introduced in which temperature change is utilized by employing a heat sensitive member. Up to now, however, there has not been provided any small-sized, simple, effective and automatic valve which is attached to the container and controlled by temperature change occurring upon vaporization of the sprayed liquid held in itself. The present invention has been achieved by noticing this fact.

One feature of the present invention resides in the fact that the latent heat of vaporization of the liquefied gas sprayed out of a pressurized container is utilized to cause expansion or contraction of heat responsive metal, liquid or gas due to the resulting temperature change so as to operate a valve coupled to such heat responsive material, with the result that the material held in the container is sprayed out automatically and intermittently. Another feature of the present invention is that in order to prevent the valve from being stopped due to equilibrium condition of cooling and heat absorption of the heat responsive member there is provided a spring urge means so that intermittent spraying operation can be constantly carried out positively.

The present invention provides a very simple and inexpensive device which repeatedly carries out automatic spraying operation without applying any external force. The field of application of this device is so wide that it can perform insect control, insecticide, sterilizing and deodorizing operations with excellent result by simply installing it in warehouses, rooms, etc.

Figure 1:
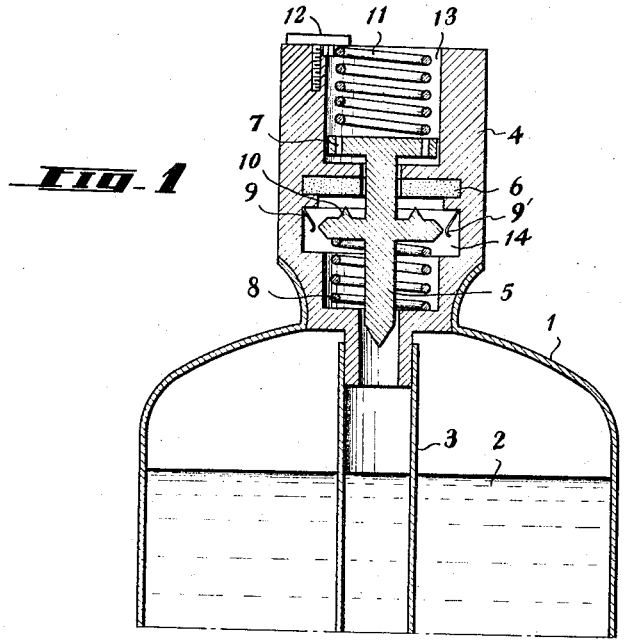
Figure 2:
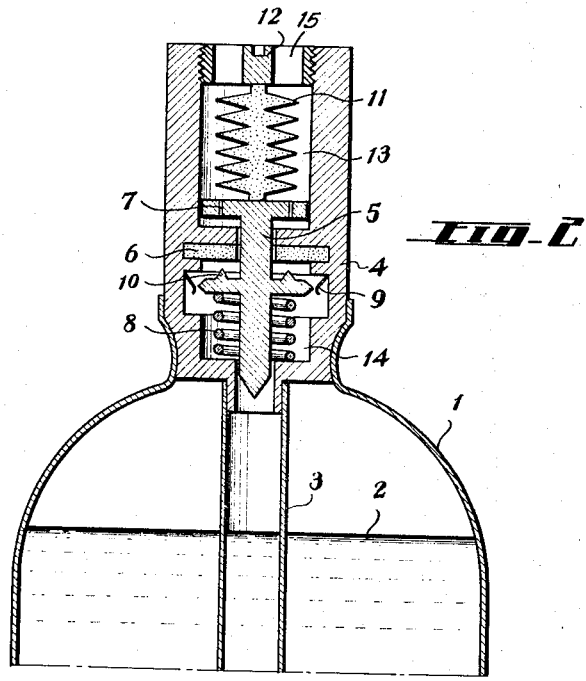
Figure 3:
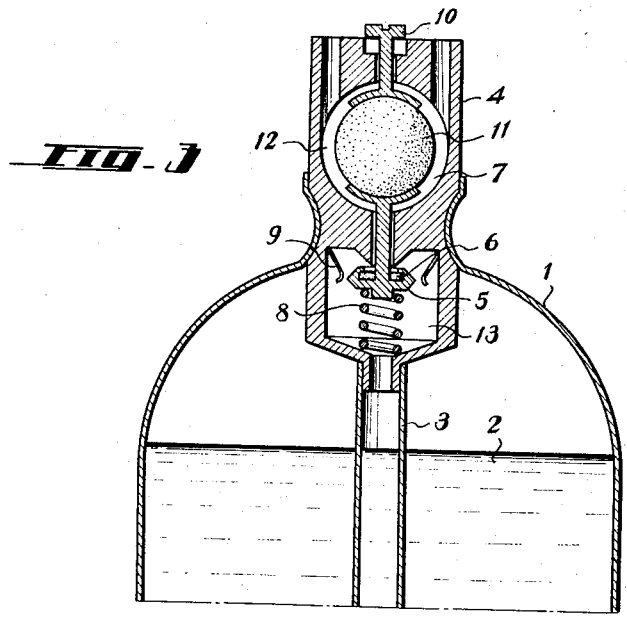
Figure 4:
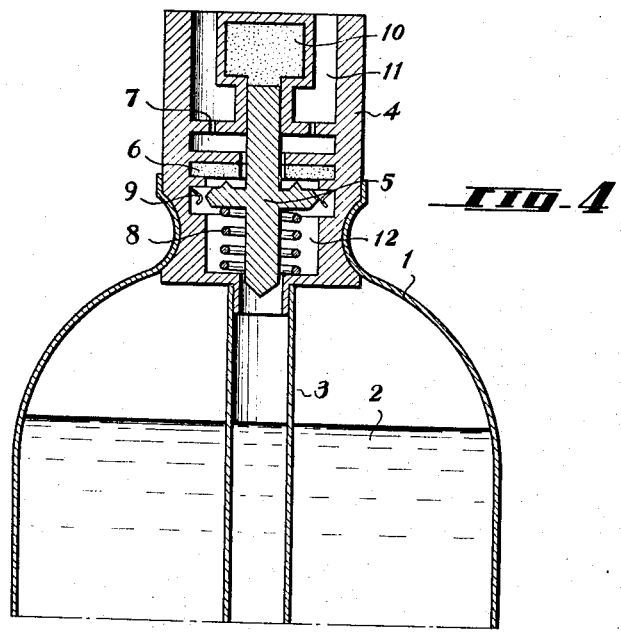

The above and other objects of the present invention will become apparent from a reading of the following description taken in conjunction with the accompanying drawings, in which:

FIG. 1 is a sectional, elevational view of one embodiment of the present invention attached to the container, this embodiment being shown to explain the principle of the present invention;

FIGS. 2, 3 and 4 respectively show sectional, elevational views of other embodiments of the present invention; and FIGS. 5 and 6 show sectional, elevational views of an embodiment of the present invention which operates by the pressure of the pressurized liquid itself.

Referring now to FIG. 1, there are shown a pressurized container 1 and liquid 2 having effective ingredient and pressurizedly held in the container 1. A conduit 3 is inserted into the liquid 2 and a housing 4 is fixed to the container 1 and comprises an upper chamber 13 and a lower chamber 14. An operative valve 5 is so arranged over the chambers 13 and 14 in the housing 4 as to be able to move vertically, and is provided at its top with a spout 7. In association with a circular seat 10 of the operative valve 5 there is provided a gasket 6 to stop the liquid 2. A spring 8 urges the operative valve 5 upwardly, and to cause the operative valve 5 to move discontinuously there is provided a stopping spring 9 whose terminal bent portion 9' is situated adjacent to the lower outer edge of the operative valve 5. A heat responsive member 11 comprising bimetal, etc. is fixed at its both ends respectively to the housing 4 and to the operative valve 5 so that the vertical length of the coil extends or contracts as the temperature rises or drops, respectively. A screw 12 is provided to fix the member 11 to the housing 4 and further to adjust said member 11. For this purpose, the screw 12 is threaded into a suitable recess provided in housing 4, as shown in FIG. 1, and its head overlies and engages a convolution of the coil member 11. Thus, threading screw 12 more or less deeply into the recess, will press the head against the convolution and axially compress the member 11, or remove the head and permit expansion of the member 11.

The operation of the device is as follows: The liquid 2 in the container 1 passes through the conduit 3, the lower chamber 14 of the housing 4, the gap between the gasket 6 and the seat 10, the spout 7, and the upper chamber 13 so as to be finally sprayed out into the air. Upon being sprayed out, the liquid is vaporized, taking the heat of vaporization from the heat responsive member 11 and the housing 4, with the result that the member 11 is rapidly cooled and its vertical length contracts. This causes upward movement of the operative valve 5, which is for a time stopped by the stopping spring 9 but, upon further cooling and contraction of the member 11, overcomes the influence of the stopping spring 9 and rises rapidly, until the circular seat 10 closely engages the gasket 6 so that the liquid 2 is prevented from flowing and the spraying operation is stopped.

After the spraying operation is stopped, the member 11 gradually absorbs heat from the air and extends gradually with the result that the operative valve 5 is pushed downwardly until it is stopped for a time due to the presence of the stopping spring 9, with the liquid 2 still prevented from flowing. Further rise in the temperature of the member 11 and the resulting extension thereof causes the operative valve 5 to be pushed down until the stopping spring 9 is pushed away, the circular seat 10 is separated from the gasket 6 so that the liquid 2 passes therebetween and sprayed out from the spout 7. Thus, without application of any outward force, the spraying operation of the pressurized liquid is automatically and intermittently repeated due to temperature change of the heat responsive member.

In FIG. 2, there are shown, as in the case of FIG. 1, a container 1, liquid 2, a conduit 3, a housing 4, an operative valve 5, a gasket 6, a spout 7, a spring 8, a stopping spring 9, a seat 10, an upper chamber 13 and a lower chamber 14. A bellows 11 contains gas or liquid therein. A movable lid 12 with a ventilating hole 15 is screw-threaded into the open end of chamber 13 and provided to adjust the position of the operative valve 5 through the temperature of the air.

The operation of this device is as follows: The liquid 2 in the container 1 passes through the conduit 3, the lower chamber 14 of the housing 4, the gap between the gasket 6 and the seat 10 and the spout 7, so that it is sprayed into the upper chamber 13. Since the upper chamber 13 communicates with the air through the ventilation hole 15, the sprayed liquid is vaporized within the chamber 13, taking the heat of vaporization from the neighbouring object, and then is sprayed out into the air. Upon this the bellows 11 is cooled and the gas or the liquid contained therein contracts. As a result, the bellows 11 contracts, operates the operative valve 5 coupled thereto and thus stops the liquid 2. After the spraying operation is stopped due to stoppage of the liquid flow, the bellows 11 absorbs heat from the air and causes the contained gas or liquid to be gradually expanded until the operative valve 5 is actuated, the liquid is passed and the spraying operation is repeated.

The operation of the device as shown in FIG. 3 is as follows: The liquid 2 passes through the conduit 3, the lower chamber 13 and the spout 7 between the operative valve 5 and the housing 4, and is sprayed out into the upper chamber 12. Here the liquid is vaporized and released into the air, cooling gas or liquid contained in a flexible ball 11. The cooled ball 11 contracts so that the operative valve 5 is pushed up by the force exerted by the spring 8, thus stopping the liquid flow and accordingly the spraying operation. After the spraying operation is stopped, the ball 11 absorbs heat from the air and causes the contained gas or liquid to expand so that the operative valve 5 is pushed down and the liquid is permitted to pass. Thus, the spraying operation is intermittently repeated. To disable the device of FIG. 3, a washer or similar means is simply inserted in the space between the head of member 10a and the housing 4.

The operation of the device as shown in FIG. 4 is as follows. The liquid 2 passes through the conduit 3, the lower chamber 12, the gap between the housing 4 and the operative valve 5 and the spout 7, and thus is sprayed out into the upper chamber 11. Here, the sprayed liquid is vaporized, taking the heat of vaporization, and then is released into the air. At this, a cylinder 10, which is arranged in the upper chamber 11, covered by good conductor of heat, and contains gas or liquid therein, is cooled so that the contained gas or liquid contracts with the result that the piston-type operative valve 5 is pushed up due to the force of the spring 8 until the gasket 6 closely engages the seat so as to stop the flow of the liquid 2 and accordingly the spraying operation. After the spraying operation is stopped, the cylinder 10 absorbs heat from the air so that the contained gas or liquid expands and pushes down the piston-type operative valve 5. Thus the liquid is permitted to pass and the spraying operation is resumed, such operation being intermittently repeated. This device is disabled by placing any suitable type of cover over the opening of housing 4.

It must be noted that the operation of the heat responsive member controlled by the temperature of ambient air differs with seasons of winter and summer: In winter heat absorption from ambient air is slow so that the period of the intermittent spraying operation tends to be prolonged, while in summer the heat absorption takes place rapidly so that the intermittent spraying operation period tends to be shortened.

In order to compensate such period variation, it is preferable that the housing containing the device to be placed in an envelope made of synthetic resin, etc. with a gap therebetween and closable path for letting in the outer air so that in winter this path is opened to obtain good heat conduction to the device and in summer this path is closed to prevent unduly great heat conduction to the device, thus suitably controlling the intermittent spraying operation period.

It must be also noted that various types of heat responsive member can be designed as necessity demands. For example, the bimetal heat responsive member can be formed into such variety of types as needle-shaped spring type, bent leaf spring type, dish-shaped type, etc.

The above description is concerned with devices which operate by actuation of heat responsive members due to temperature change owing to taking of heat of vaporization. It must be noted that the same effect can be obtained by utilizing compressed gas instead of the liquefied gas.

The device as shown in FIGS. 5 and 6 carries out the intermittent spraying operation utilizing the pressure of liquefied gas or compressed gas itself. In the drawing a portion of the pressurized container is indicated by the numeral 1 and the conduit for the contained material by the numeral 2. A housing 3 is fixed to the pressurized container and the interior thereof is divided into upper and lower chambers 4 and 5, respectively. The housing 3 is further provided with a passage 16 for sending the gas phase material into the upper portion of the upper chamber and also with a spout 6 for spraying out the material. In the lower chamber 4 there is provided a stopping valve 7 which moves vertically in said chamber and is provided with an air-tight gasket 8 to engage the valve seat a by means of a spring 9. In the upper chamber 5 there are arranged, as shown in the drawing, a diaphragm 10 which moves up or down due to pressure of gas phase of the liquefied gas or compressed gas, a valve rod 11 which moves together with said diaphragm 10 and whose end portion 11a is of different diameter and screwthreaded, a stopping arm 12 and a stopping spring 13 for causing discontinuous movement of the diaphragm 10, a spring 15 for normally urging the diaphragm upwardly, and a valve rod 14 for opening or closing the stopping valve 7. Rod 11 can be adjusted relative to the housing 3 via the screwthreaded rod end portion 11a, thus adjusting the amount of movement of valve 8.

As the portion which moves up or down due to the gas phase pressure of the liquefied gas or compressed gas, instead of the diaphragm any device of similar function such as a piston, a bellows, etc. may be utilized. A chamber 18 holds a floating valve 19 which moves in the passage 16 of liquefied gas or compressed gas, as the flowing speed of such gas varies. A valve seat d is arranged at the outlet portion of the vaporized gas passage. The floating valve and the valve seat are so arranged as to form a slight gap therebetween. A stopping member 17 is arranged in order to keep the valve rod 11 at its lifted position while the device is in stored state so as to prevent the diaphragm 10 from being actuated.

The operation of this device is as follows: When the stopping member 17 is loosened and the floating valve 19 is in its dropped position, the liquefied gas or the compressed gas passes through the passage 16 and reaches the space over the diaphragm. Thus the pressure of the gas pushing down the diaphragm gradually increases until the diaphragm moves down rapidly against the influence of the stopping spring 13, the stopping valve 7 is opened due to movement of the valve rod 14, and the contained material is sprayed out into the air, as shown in FIG. 6. On the other hand, the gas phase valve rod 11 moves down as the diaphragm moves down until the stepped portion due to the diameter difference reaches the discharge hole c, when the gas over the diaphragm is released into the air. Then, the vapor in the container, in its rapid movement through and out of the passage 16, pushes up the floating valve 19 into tight engagement with the valve seat d to prevent the gas phase from being discharged. At this, the diaphragm 10 returns to its original position by the influence of the spring 15. Since there is a slight gap between the floating valve 19 and the valve seat $d$, the vapor gradually leaks into the space $b$ over the diaphragm, and when the pressure difference between the space $b$ and the container becomes sufficiently small, the floating valve 19 drops and sends gas phase sufficiently to the space $b$ over the diaphragm so that the operation is repeated.

While there have been described and illustrated preferred embodiments of the present invention, it must be understood that numerous other embodiments may be made without departing from the spirit of the present invention.

What is claimed is:

1. A dispenser for pressurized fluids, comprising, in combination, a receptacle defining a plenum chamber for a supply of coolant fluid; and a thermostatic valve communicating with said chamber for escape of fluid therefrom, said valve comprising a thermo-responsive element arranged in the path of escaping coolant fluid for closing said valve in response to cooling resulting from such escaping fluid, and said element being in the closed condition of said valve sealed from the coolant fluid and exposed to the ambient atmosphere so as to open said valve in response to heating to the temperature of such atmosphere.

2. A dispenser as defined in claim 1, wherein said valve further comprises a valve seat and a valve member operatively connected with said thermo-responsive element and adapted to move into and out of sealing engagement with said valve seat.

3. A dispenser as defined in claim 2, wherein said thermo-responsive element is arranged to contract in response to cooling, and to expand in response to heating.

4. A dispenser as defined in claim 3, wherein said thermo-responsive element is a bi-metallic device.

5. A dispenser as defined in claim 3, wherein said thermo-responsive element comprises a container defining an interior chamber, and a body of fluid accommodated in said interior chamber, said fluid being subject to volume increase in response to heating of said container and to volume decreases in response to cooling of said container.

6. A dispenser as defined in claim 5, wherein said fluid is a gas.

7. A dispenser as defined in claim 5, wherein said fluid is a liquid.

8. A dispenser as defined in claim 5, wherein said container is a bellows of yieldable material.

9. A dispenser as defined in claim 5, wherein said container is a sphere of yieldable material.

10. A dispenser as defined in claim 5, wherein said plenum chamber has an opening, and wherein said valve member includes a valve stem having a portion extending sealingly into said opening with freedom of reciprocatory movement therein when said valve member moves into and out of sealing engagement with said valve seat.

11. A dispenser as defined in claim 2, and further comprising delay means operatively associated with said valve member and arranged to subject movement of the same into and out of sealing engagement to a predetermined delay.

References Cited

UNITED STATES PATENTS

| | | | |
|---|---|---|---|
| 824,441 | 6/1906 | Scales et al. | 236—58 |
| 1,560,689 | 11/1925 | Holt et al. | 222—477 |
| 1,573,879 | 2/1926 | Still et al. | 236—58 X |
| 2,097,585 | 11/1926 | Carson. | |
| 2,261,080 | 10/1941 | Stellhorn | 222—54 |
| 2,310,576 | 2/1943 | Dodge | 222—54 X |
| 2,337,077 | 12/1943 | Woodman | 222—54 X |
| 2,518,259 | 8/1950 | Stevenson | 222—477 X |
| 2,524,796 | 10/1950 | Higgins | 239—75 |
| 2,948,436 | 8/1960 | Federighi et al. | 222—54 |
| 3,214,061 | 10/1965 | Mills | 222—54 |
| 3,282,294 | 11/1966 | Corniello | 137—624.14 |

SAMUEL F. COLEMAN, *Primary Examiner.*